US008301587B2

(12) United States Patent
Singh

(10) Patent No.: US 8,301,587 B2
(45) Date of Patent: *Oct. 30, 2012

(54) INTERNET ENABLED COMPUTER SYSTEM MANAGEMENT

(75) Inventor: Jitendra K. Singh, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2398 days.

This patent is subject to a terminal disclaimer.

(21) Appl. No.: 10/882,721

(22) Filed: Jul. 1, 2004

(65) Prior Publication Data

US 2004/0243609 A1 Dec. 2, 2004

(51) Int. Cl.
*G06F 17/00* (2006.01)
(52) U.S. Cl. ........ 707/609; 707/610; 707/694; 707/758; 709/203; 709/220; 709/224
(58) Field of Classification Search .................. 370/352; 705/26; 707/10, 104.1, 203, 609, 610, 612, 707/694, 758; 709/206, 220, 223
See application file for complete search history.

(56) References Cited

U.S. PATENT DOCUMENTS

| | | | | |
|---|---|---|---|---|
| 5,155,847 A | * | 10/1992 | Kirouac et al. | 709/221 |
| 5,257,368 A | * | 10/1993 | Benson et al. | 707/999.001 |
| 5,287,505 A | * | 2/1994 | Calvert et al. | 709/223 |
| 5,388,212 A | * | 2/1995 | Grube et al. | 705/28 |
| 5,408,334 A | * | 4/1995 | Yamagishi et al. | 358/402 |
| 5,432,932 A | | 7/1995 | Chen et al. | |
| 5,483,468 A | | 1/1996 | Chen et al. | |
| 5,742,762 A | | 4/1998 | Scholl et al. | |
| 5,751,943 A | * | 5/1998 | Benzenberg et al. | 709/220 |
| 5,764,955 A | | 6/1998 | Doolan | |
| 5,819,028 A | | 10/1998 | Manghirmalani et al. | |
| 5,835,911 A | * | 11/1998 | Nakagawa et al. | 707/999.003 |
| 5,867,714 A | * | 2/1999 | Todd et al. | 707/999.01 |
| 5,872,928 A | | 2/1999 | Lewis et al. | |
| 5,878,419 A | * | 3/1999 | Carter | 707/758 |
| 5,901,320 A | * | 5/1999 | Takahashi et al. | 709/223 |
| 5,913,066 A | * | 6/1999 | Benzenberg et al. | 709/220 |
| 5,926,463 A | | 7/1999 | Ahearn et al. | |
| 5,930,476 A | | 7/1999 | Yamunachari et al. | |
| 5,961,590 A | * | 10/1999 | Mendez et al. | 709/206 |

(Continued)

FOREIGN PATENT DOCUMENTS

EP 052770 12/1992

(Continued)

OTHER PUBLICATIONS

Amy K. Larsen, Making the Web Work for Management, Product Leaders, Data Communications, Dec 1996, pp. 33-34.

(Continued)

*Primary Examiner* — Christyann Pulliam
*Assistant Examiner* — Rezwanul Mahmood

(57) ABSTRACT

System configuration is verified. Configuration information for a managed system is generated. The configuration information indicates existing software and hardware residing on the managed system. The configuration information is sent from the managed system to a management system. The management system compares the configuration information from the managed system with database information that indicates software and hardware supported by the management system in order to generate validity information that indicates any software or hardware on the managed system that is not supported by the management system. The validity information is sent from the management system to the managed system.

2 Claims, 9 Drawing Sheets

U.S. PATENT DOCUMENTS

| | | | |
|---|---|---|---|
| 6,038,586 A * | 3/2000 | Frye | 718/100 |
| 6,138,153 A * | 10/2000 | Collins et al. | 709/221 |
| 6,151,643 A * | 11/2000 | Cheng et al. | 709/224 |
| 6,212,536 B1 | 4/2001 | Klassen et al. | |
| 6,308,206 B1 * | 10/2001 | Singh | 709/224 |
| 6,314,565 B1 * | 11/2001 | Kenner et al. | 717/171 |
| 6,434,600 B2 | 8/2002 | Waite et al. | |
| 6,484,149 B1 | 11/2002 | Jammes et al. | |
| 6,650,890 B1 | 11/2003 | Irlam et al. | |
| 6,725,425 B1 | 4/2004 | Rajan et al. | |
| 6,779,029 B2 * | 8/2004 | Singh | 709/224 |

FOREIGN PATENT DOCUMENTS

| | | |
|---|---|---|
| JP | 08227355 | 9/1996 |
| JP | 09134297 | 5/1997 |

OTHER PUBLICATIONS

Amy K. Larsen, Network Management Analysis, Data Communications, Jan. 1997, pp. 116, 118.

Apostolopoulos, Theodore K. et al., Temporal Network Management Model Concepts and Implementation Issues, Computer Communications 20, Dept. of Informatics, Athens Univ of Economics & Business Mar. 15, 1996/Aug. 2, 1996 pp 1-15.

Heywood, Peter, Network Management Comes to the Masses, Product Leaders, May 1997, pp. 35-36.

IBM Corp 1993, Enhanced Method for Monitoring Critical Resources in Token Ring Networks, IBM Tech. Disci. Bulletin, Jan. 1997, US, vol. 40, pp. 111-122.

Jander, Mary, Welcome to the Revolution, Data Communications, Nov. 21, 1996, pp. 39-42,44,46,48,50,52, 53.

Larse, Amy K., The Next Web Wave: Network Management, Network Analysis, 8178 Data Communications, No. 1, Jan. 25, 1996, pp. 31-33.

Larsen, Amy K., Weaving the Management Web, 8178 Data Communications, Jan. 1996, pp. 92-93.

Michael Howard et al., Managing Devices with the Web, Byte, Sept 1997, pp. 45-46.

Pitkow, James, in Search of Reliable Usage Data on the Www, Xerox Palo Alto Research Center, Palo Alto, CA 94304, Computer Networks & ISDN Systems 29, 1997, pp. 1343-1355.

Poon, Koon-Yui, Inside a Trader in Global Trading, 1995-Elsevier Science B.V., Computer Communications, vol. 18, no. 4, Apr. 1995, pp. 227-246.

* cited by examiner

INTERNET ENABLED COMPUTER SYSTEM MANAGEMENT

BACKGROUND OF THE INVENTION

Computer system management as currently implemented relies heavily on such known management platforms as Hewlett-Packard Co.'s ("HP") OpenView, IBM's NetView, Sun Microsystem's SunNet Manager, and others. These platforms are typically used with third party tools that perform the specific tasks required to manage particular devices, including Intel-based PC desktop computers and server systems, network devices such as hubs, bridges, and routers, and other similar equipment. Examples of these third party tools include HP's NetServer Assistant for managing the NetServer line of computers and Interconnect Manager used for managing network devices such as routers. As a general rule, these tools are complex, expensive, and difficult to use without extensive training.

SUMMARY OF THE INVENTION

The Internet makes it possible to create applications that perform many of the functions now performed by management platforms and third party add-on tools in a much simpler manner. These applications will be easier to use by novices than known tools and will lower the overall cost of system management.

The embodiments of the present invention described herein require certain generic computer systems and components to function. There must be a set of computer systems or network devices that must be managed. A set of client systems are used to manage the sets of computer systems and/or network devices. In some cases, the managed system and the client system are the same system. At the manufacturer's site, a system is located and used for warehousing and analyzing data from the managed systems. The manufacturer's system is only needed for implementing such management features as analysis and verification of system information, transmission of advisory information back to users and system registration.

Any of the known web browsers such as Netscape Corp.'s Netscape Navigator or Microsoft Corp.'s Internet Explorer must be installed on all client systems used as management systems and at least one of the managed or client systems must have an Internet HTTP Server (Web Server) running on it. Finally, an implementation of one of the known technologies that make it possible to retrieve and/or alter configuration information is needed on the managed and client systems, including an implementation of any one of Simple Network Management Protocols ("SNMP"), DMTF/DMI, ISO/CMIP or other proprietary protocols.

With these required components, all of which are known, the system's configuration can be viewed or changed over the Internet using an HTML document to list and display the managed systems, together with icons that represent the state of the managed systems. By using "active controls" or Java scripts, the state of the managed systems can be dynamically updated by changing the color of associated icons or the displayed text. Using embedded commands or identifiers within template documents, a program can be created to automatically acquire needed system information.

In another embodiment, an HTML CGI document containing desired system information and a reference link back to the system at the manufacturer's selected site is created, allowing the manufacturer's system to retrieve this system information automatically. The system information is then analyzed against a list of currently valid system configurations to detect potential problems. In turn, if potential problems are detected, the information is sent back to the managed system automatically.

DETAILED DESCRIPTION OF THE PREFERRED EMBODIMENTS

Figure 1:
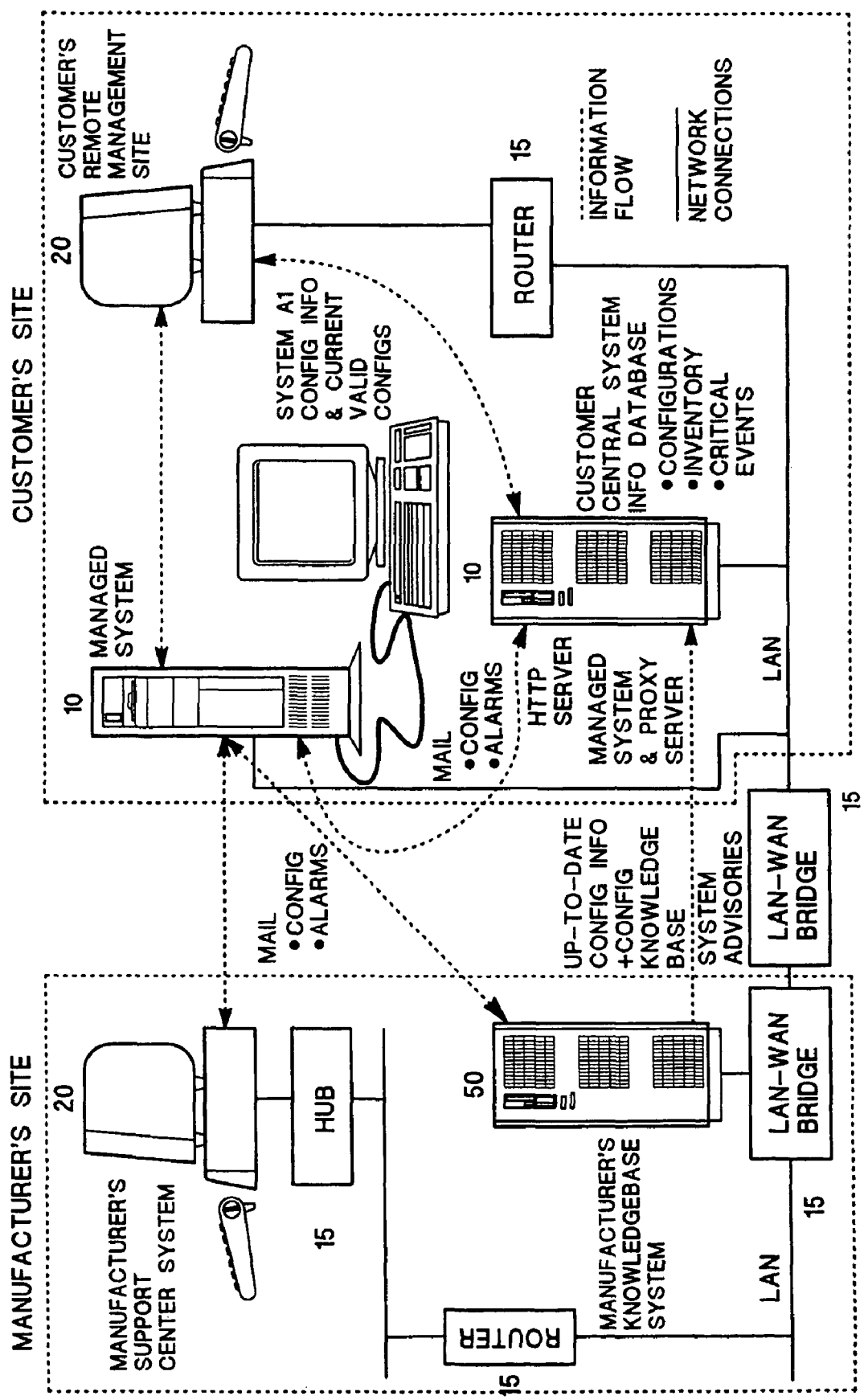
FIG. 1 is a block diagram showing the system components and architecture of the present invention.

The various embodiments of the present invention can operate within any particular realization of the generalized system architecture shown in FIG. 1. This generalized architecture comprises a set of computer systems 10, a set of network devices 15, or any combination of computer systems 10 and network devices 15, all of which must be managed. A set of client systems 20 are used to manage the computer systems 10 and the network devices 15. In at least one embodiment, it is possible that the managed computer system 10 and the client system 20 doing the management comprise the same system.

In several embodiments of the present invention, a manufacturer's system 50 is used for warehousing and analyzing data from and for the managed systems. Manufacturer's system 50 is only necessary for implementing such features as analysis and verification of managed systems' information, system registration, and transmission of advisory information back to the customers.

A web browser such as Netscape Corp.'s Navigator or Microsoft Corp.'s Internet Explorer must be installed on all client systems 20 used to manage other systems. At least one of the managed systems 10 or the client systems 20 needs an Internet HTTP server, also known as a Web Server, running on it. Finally, the managed systems 10 and the client systems 20 need an implementation of at least one of several known or proprietary technologies that permit the retrieval and altering of desired configuration information. These implementations can include any one of SNMP, DMTF/DMI, or ISO/CMIP.

Configuration Management

Figure 2:
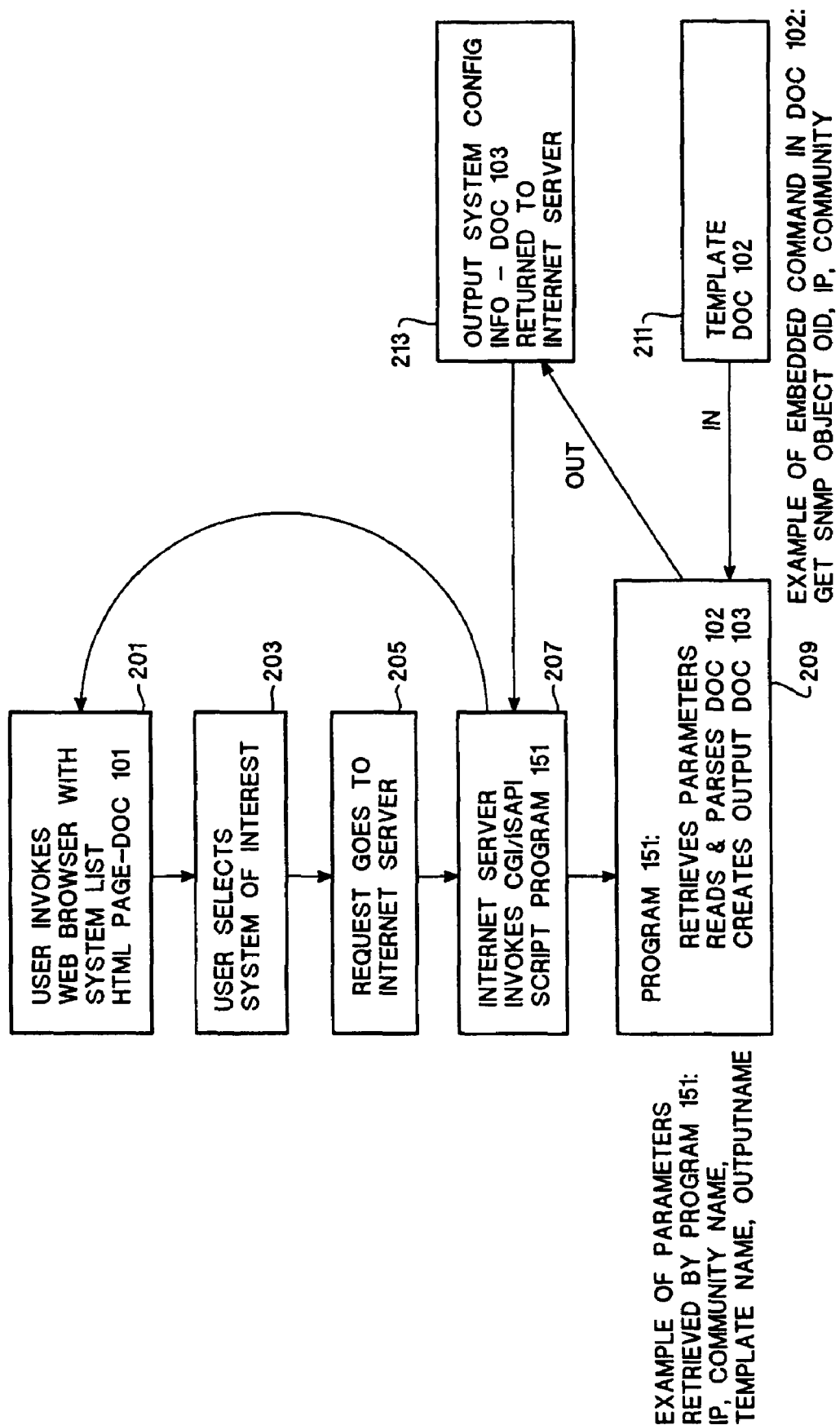
FIG. 2 is a flow chart for a first embodiment of the present invention.

In a first embodiment of the present invention, configuration management is accomplished by using various Web-based elements. As shown in FIG. 2, an HTML document 101 that lists the managed systems and devices is created (FIG. 2, step 201). Document 101 contains a list of system names linked to Uniform Resource Locators ("URL"s) that point uniquely to a Common Gateway Interface ("CGI") or a Microsoft Internet Server Application Programming Interface ("MS ISAPI") script program 151. When invoked or executed by user actions (FIG. 2, steps 201 and 203), which actions include clicking on the system name, script program 151 generates HTML document 103 that contains the system information, which can then be displayed (FIG. 2, step 209). Document 101 can be automatically generated by a program using an auto-discovery algorithm such as HP's OpenView or it may be manually created using an HTML editor, in which case the users will need to know the URLs for the systems being managed.

In this implementation, script program 151 can be located either on the system/device being managed or on another system that has an HTTP (Web Server) server, or on both systems. This allows one system to be a proxy for another system or to be a backup system. This is helpful when the particular system of interest is down or if the system cannot run an HTTP server. Using proxies creates redundancy and also permits using the management facilities described herein with devices that are not able or do not want to run an HTTP server.

An HTML configuration template document 102 is created using any preferred HTML editor (FIG. 2, step 211). Document 102 will contain such standard HTML elements as labels, icons, text, references to Java scripts, active objects and other documents as necessary. In places where the actual parameter values are displayed, a placeholder is embedded. The placeholder includes an identifying start meta character at the beginning and an end meta character at the end of the placeholder to make the placeholder identifiable to script program 151. The body of the placeholder contains identification information such as SNMP object ID, that uniquely identifies the attribute whose value is to be retrieved and displayed.

The CGI or ISAPI script program 151 is invoked by the HTTP server as a result of an end user request for information, which the user initiates by "clicking" on the icon or symbol labeled with the device name in the system/device list of document 101 (FIG. 2, step 203). When invoked, script program 151 retrieves parameters passed to it using standard CGI/ISAPI interfaces (FIG. 2, step 209). In this embodiment of the present invention, the parameters are: a) information type (existing/new); b) IP address of the system of interest; c) SNMP community name; d) system configuration file name; and e) template file name. The information type parameter indicates whether the program is to return an existing configuration file or whether it must create a new one. The IP address parameter identifies the system for which information is to be retrieved (the managed system). The SNMP community name (an SNMP artifact used for security) identifies the community to which the SNMP agent used for retrieving the requested information belongs. The system configuration file name is the name of the file to which newly retrieved information is written to. The template file name is the name of the template file the program will use to determine what information is to be retrieved.

After script program 151 retrieves this information, it parses the template document, sequentially retrieves the embedded object identifiers, performs an SNMP or other request to retrieve the value of the requested attribute (object), converting the retrieved value to a meaningful form if necessary, and replaces the embedded placeholder with this value (FIG. 2, step 209). Once all required values have been obtained, script program 151 writes the generated file, document 103, out to disk using the system configuration file name retrieved from the passed parameters (FIG. 2, step 213). It then passes a reference back to the HTTP server indicating that the server should return this file to the user initiating the request (FIG. 2, arrow from step 207 to step 201).

Real Time System Configuration Verification

In this embodiment, system configuration information can be verified in real time with minimal customer effort. This function is difficult to implement under existing non-Web based technologies and is typically not provided by vendors.

The process to verify system configurations starts with the user loading HTML document 101 and clicking on the appropriate icon or label representing the system of interest. This causes CGI script program 151 to be executed on one of the managed systems 10. Script program 151 then fills the fields in a template form 102, creating document 103 (described below). The process by which script program 151 fills template form 102 to create document 103 is similar to that described in the preceding embodiment. Once document 102 is filled out by program 151, document 102 is returned to the user's Web browser as document 103(FIG. 3, step 251).

Document 103 is a CGI form in which all the fields are labeled. For example, in addition to including a label "System Name", there is a field value parameter which is assigned the value of System Name, e.g. "Mango".

CGI form document 103 contains a "submit" button. When a user clicks on this button (FIG. 3, step 253), the contents (name-value pairs) of document 103 are transmitted to the system referenced in the form URL. In this case, the referenced system is system 50 at the manufacturer's location (FIG. 3, step 255). On receiving document 103, the HTTP server on system 50 executes a script program 153 defined in the URL. Program 153 parses document 103 and saves the parameter values retrieved from it in a database 200.

Figure 3:
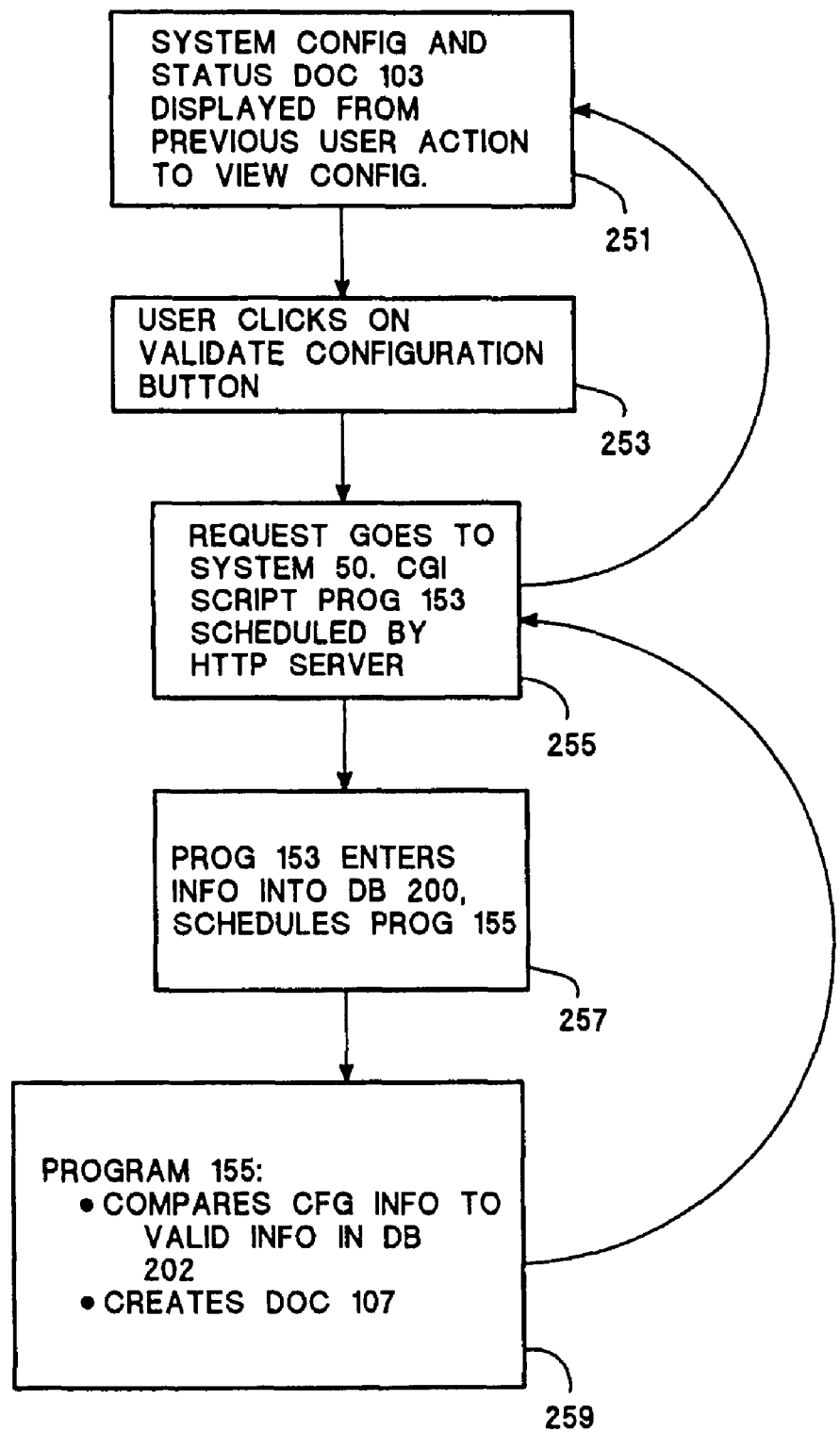
FIG. 3 is a flow chart for a second embodiment of the present invention.

Script program 153 then executes program 155 on system 50 with a pointer to the data that was just entered database 200 (FIG. 3, step 257). Program 155 retrieves this data and compares specific system configuration information such as version numbers of the software components and supported hardware/software against those in a standard/supported system configuration database 202, which is independently created (FIG. 3, step 259). The results of this comparison reveal differences between the configurations of the managed systems 10 and currently valid configurations. Examples of these differences could be differences in the versions of software/firmware/hardware components or the presence of hardware/software components that are known to have potential problems. Once these differences are determined, program 155 prepares a difference report formatted as an HTML document, document 107, and passes it back to script program 153 (FIG. 3, step 259 to step 255). Program 153 then returns document 107 to the client browser 20 from which the request originated using a standard HTTP protocol (FIG. 3, step 255 to step 251).

Mail/HTTP-Based System Configuration Verification and Customer Advisories

The previously described methods for Configuration Management and Real Time System Configuration Validation assume a user invokes a Web browser and requests system information. In the following embodiment, configuration information is created and transmitted without user intervention, the advisory corresponding to potential problems or out of date components, and the advisory being transmitted back to the user asynchronously via the Internet or other e-Mail mechanisms.

Figure 4:
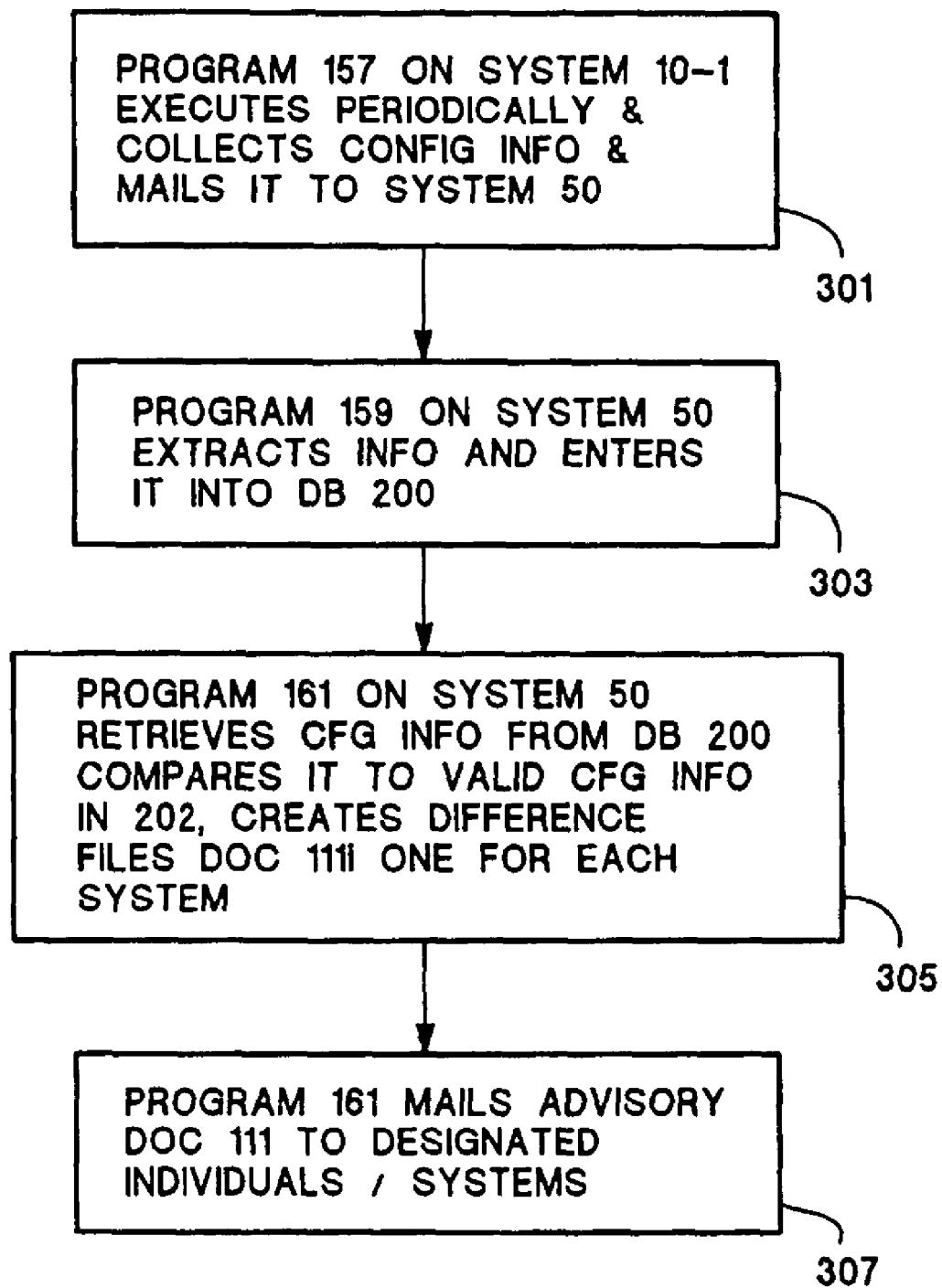
FIG. 4 is a flow chart for another embodiment of the present invention.

This method requires a program 157 running on one or more of the managed systems 10 (FIG. 4, step 301). A modified version of program 153, called here program 159, plus a modified version of program 155, called here program 161, run on system 50 at the vendor's location. In addition to these programs, an e-Mail system must be running on system 50. The e-Mail system must be able to send and receive electronic mail messages to and from other systems that are connected to the Internet.

Program 157 executes at predetermined periodic intervals on systems 10. It can be configured to run on each of the managed systems 10, on one of the managed systems 10, or on some number of systems between these extremes. In those cases where program 157 is not running on all the systems, it behaves as a proxy agent and is able to retrieve information from the other systems for which it is configured to be a proxy.

When program 157 executes, it retrieves data from one or more of the managed systems 10 using one of the standard or proprietary protocols such as SNMP or DMI. It then creates a set of files 109, one for each system it is configured for, which contains detailed system information. The specifics of the information are determined by template document 102. In addition to the system information, program 157 also creates appropriate e-Mail headers that include mailing lists so that document 109 has a format and fields compatible with the e-Mail system so that document 109 can be sent to the configured destinations.

Program 157 submits files 109 to the e-Mail program by placing them in the outgoing bin or, alternatively, communicating directly with the e-Mail server using standard APIs such as MAPI.

The e-Mail system takes the files generated by program 157 and delivers them to the recipient, which in this implementation is program 159 running on system 50. Program 159 extracts the system information and downloads it into database 200 (FIG. 4, step 303).

Program 161 executes at configured intervals on system 50. It extracts information from database 200 sequentially, compares this information with standard information of valid configurations in database 202 and generates a set of files, called document 111, one for each system for which configuration analysis is performed or on which configuration obsolescence is detected (FIG. 4, step 305). Program 161 adds appropriate e-Mail system headers that include destination addresses of configured recipients and writes these to the outgoing bin of the e-Mail system or uses the e-Mail system's APIs to submit them to the e-Mail system (FIG. 4, step 307). The e-Mail system in turn delivers them to the recipient.

System Registration

In general, most customers do not fill out system registration forms. Perhaps the customer sees no benefit to spending time filling out the forms. This embodiment of the present invention eliminates some of the effort needed to fill out these forms. It also makes possible the collection of substantially more system information, making it possible to send advisory information back to customers automatically when components become obsolete or when problems are discovered, using the previously described embodiments.

Figure 5:
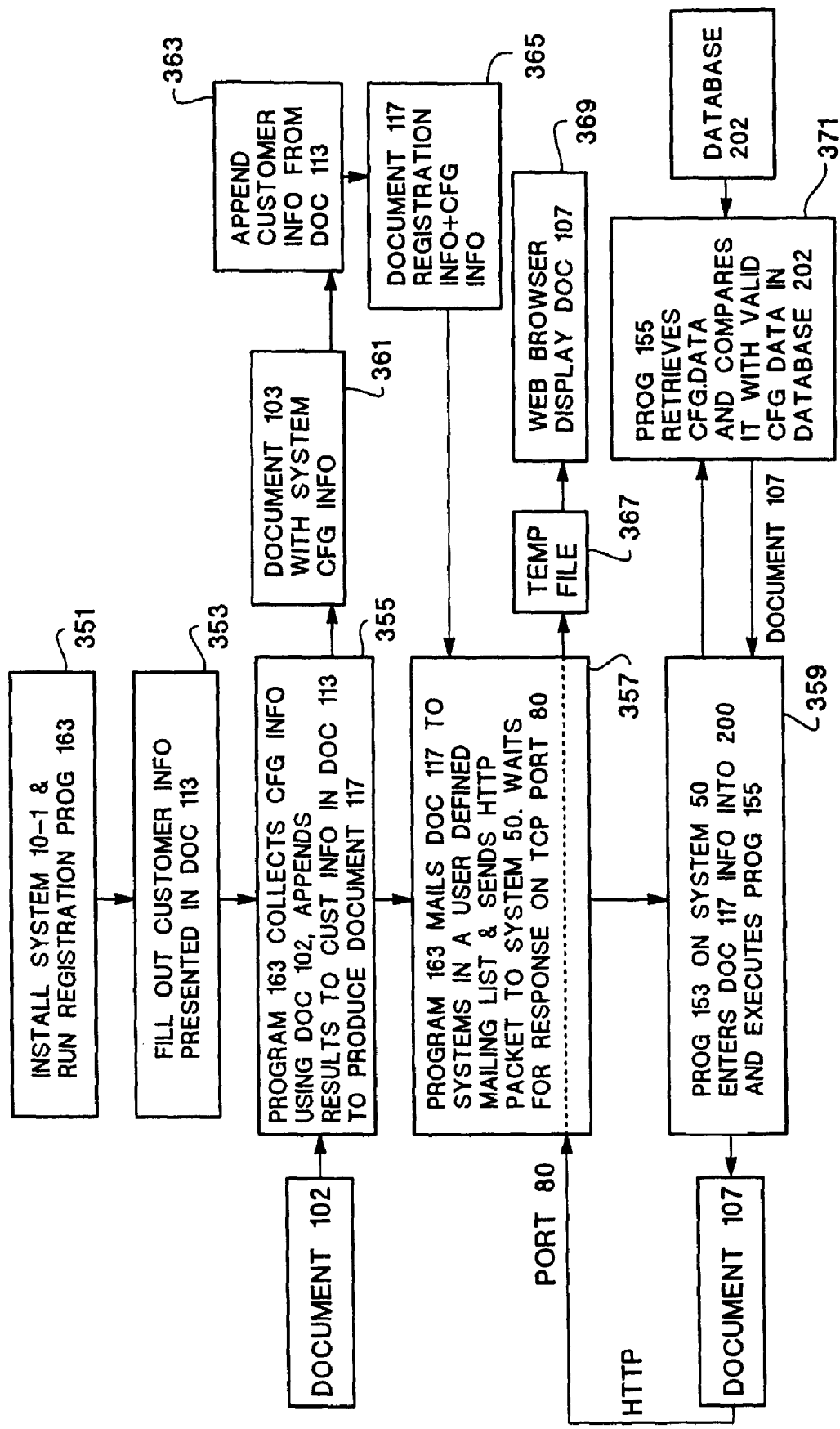
FIG. 5 is a flow chart for yet another embodiment of the present invention.

After the customer has received the newly purchased system, installation is accomplished by executing an installation program. The last part of the installation program is modified so that it executes program 163 (FIG. 5, step 351). Program 163 brings up an electronic form document 113 for the customer to fill out (FIG. 5, step 353). The customer fills out basic information such as the customer's name and e-Mail address. After this information is entered, program 163 uses template document 102 to gather system configuration information in a manner similar to program 151 and creates document 117 by appending the basic customer information to configuration information using the CGI form "Name-Value" format (FIG. 5, step 355).

Document 117 is an HTML form consisting of name-value pairs for customer information, entered by the customer, and the system configuration information entered by program 163. The form URL points to program 153 on system 50.

After creating document 117, program 163 takes one or both of the following actions: (1) transmits document 117 as a CGI script form to system 50 at the manufacturer's site using the HTTP protocol (FIG. 5, step 357), and (2) adds e-Mail headers to document 117 and places it in the outgoing bin of the electronic mail system located somewhere in the customer's network. The mail system delivers document 117 to systems on a predetermined mail distribution list. The specific action taken depends on: (1) whether the customer wants a real time check of his system configuration and (2) whether the customer wants systems at multiple locations to save this configuration information. After transmitting these documents, program 163 waits for a response on the same TCP/IP port as a web browser, typically port 80.

To the web server on system 50, document 117 transmitted over HTTP looks identical to a CGI form request that would have been generated had document 117 been displayed in the context of a web browser and had a user clicked on the "Validate Configuration" button. This results in the same actions described under the "Real Time System Configuration Verification" section (FIG. 5, step 369). Program 153 retrieves information in document 117, enters it into database 200, and executes program 155 with a pointer to the data just entered in database 200 (FIG. 5, step 359). Program 155 retrieves the data just entered and compares it with standard/supported system database 202 (FIG. 5, step 371). The differences between the configuration of the system being currently registered and the standard configuration are then formatted as an HTML document 107 and passed back to the script program 153. Program 153 then returns document 107 to the system being registered. Document 107 is then received by program 163 (FIG. 5, step 357), which was waiting for a response on port 80. Program 163 then writes document 107 to a file (FIG. 5, step 367) and executes the web browser with a command line parameter pointing to it (FIG. 5, step 369). This causes document 107 to be displayed by the web browser on the system being registered and provides immediate feedback on any potential configuration problems.

System Alert Monitoring and Exception Handling

A system alert condition is generated when some system parameter exceeds predetermined boundary conditions. For example, if the system temperature goes too high, an alert is triggered. Traditional methods for handling alerts use industry standard or proprietary protocols such as SNMP or DMTF/DMI and send alert information packets to receiving system management consoles like HP's OpenView. At these consoles icons representing the systems from which the alerts originate change colors (from, for example, green to red). This notifies the administrator that something is wrong.

Figure 6:
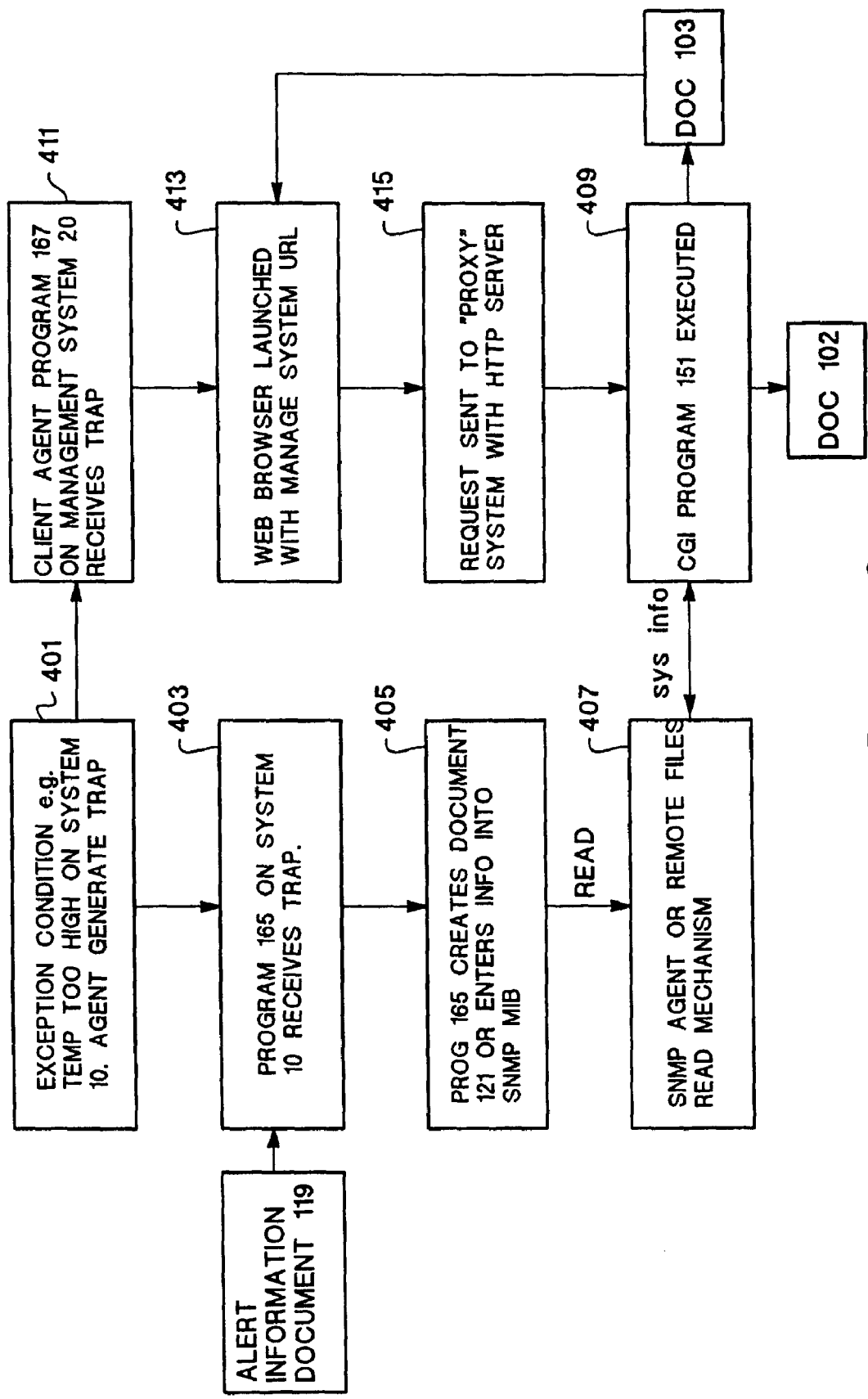
FIGS. 6, 7, 8, and 9 are flow charts for different implementations of another embodiment of the present invention.

In this embodiment, program 165 executes on managed systems 10 waiting for alerts from the local SNMP or DMI agents (FIG. 6, steps 401 and 403). On reception of an alert, program 165 decodes the alerts using the alert ID to index into an alert translation data file document 119. Based on the alert ID the alert data file returns an alert record consisting of the following fields: (1) alert type, (2) alert description, (3) system name, (4) the name of an icon bit map file used to display this alert in the web browser, and (5) a URL reference to the help files, document 120, that provides additional information about the alert. This record is entered into a local trap Management Information Base ("MIB") table, if SNMP is used, or another document 121 (FIG. 6, step 405).

Like program 165, program 167 also receives SNMP or DMI alerts on the management system 20. When an alert is received, program 167 determines the system from which the alert came, based on the addressing information in the alert packet (FIG. 6, step 407). It then launches the local web browser with command line parameters that point to the CGI script program 151 and the system name from which the alert was received. Script program 151 reconstructs document 103 using appropriate icons specified in document 121 or the SNMP local trap MIB (FIG. 6, step 409), links the icons to help files associated with the icons and returns document 103 to the browser as described under the earlier Configuration Management embodiment (FIG. 6, step 413). The browser in turn displays document 103. When a user clicks on the icon representing system/sub-system status, the browser displays the help document that was linked to the icon.

Figure 7:
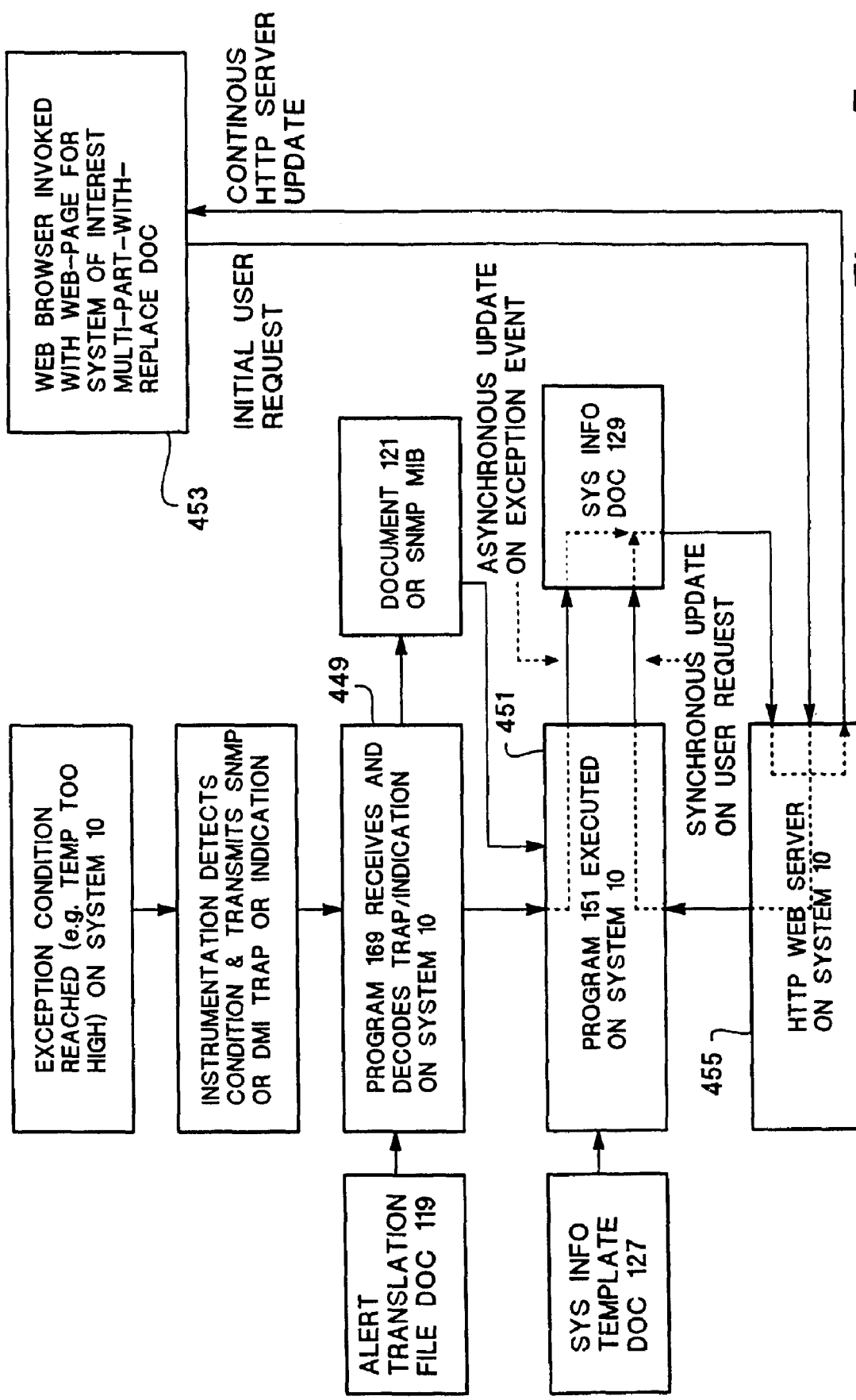

In an alternative implementation of this embodiment (see FIG. 7), document 102 is modified by changing the header information to produce document 123. When program 151 receives a request from the HTTP server it uses the modified document 123 to create document 125 which is identical to document 103 except for the header information (FIG. 7, step 451). The header information indicates to the web browser that document 125 must be updated periodically. Each time the browser requests an update (FIG. 7, step 453), program 151 is executed by the HTTP server (FIG. 7, step 455) and it re-creates document 125 with the latest system status and configuration information and returns it to the web browser. This ensures that all alerts generated since the last update are reflected in the system status section of the newly created document 125.

Figure 8:
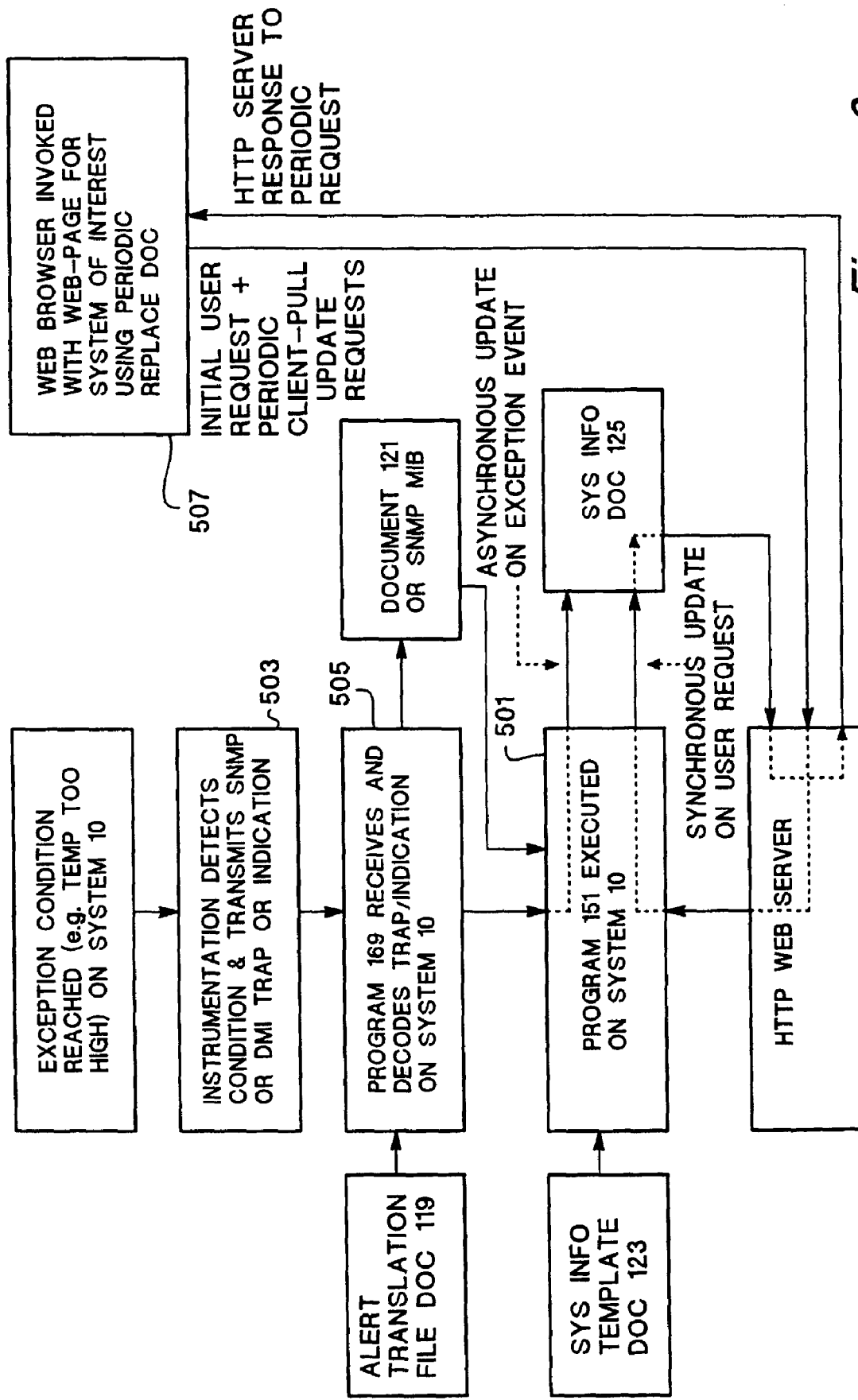

In a third alternative implementation of this embodiment (see FIG. 8), program 151, a modified version of program 165, here called program 169, and the HTTP web server all execute on managed systems 10. Program 169 is similar to program 165, except that it executes program 151 upon receiving an alert in addition to its normal functions. In this implementation, document 102 is replaced by document 127. Document 127 is identical to document 102 except the header information is modified to indicate that it is a "multi-part-with-replace" document, a known type of document. When web browsers receive such documents, they connect to the web browser asynchronously. When a user initiates a request in this implementation, program 151 uses document 127 to create document 129 (FIG. 8, step 501), which is document 103 with a modified header. As the header information from the template is directly copied to the output document, document 129 is also a "multi-part-with-replace" document. When an alert is received by program 169 (FIG. 8, steps 503 and 505), it launches program 151 with an appropriate command line indicating it should re-create document 129 and re-transmit it to the web browser (FIG. 8, step 507). The technique used here to asynchronously send documents on alert conditions to the web browser is commonly referred to as "Server Push", i.e., documents are pushed from the HTTP server without being explicitly requested by the web browser.

Figure 9:
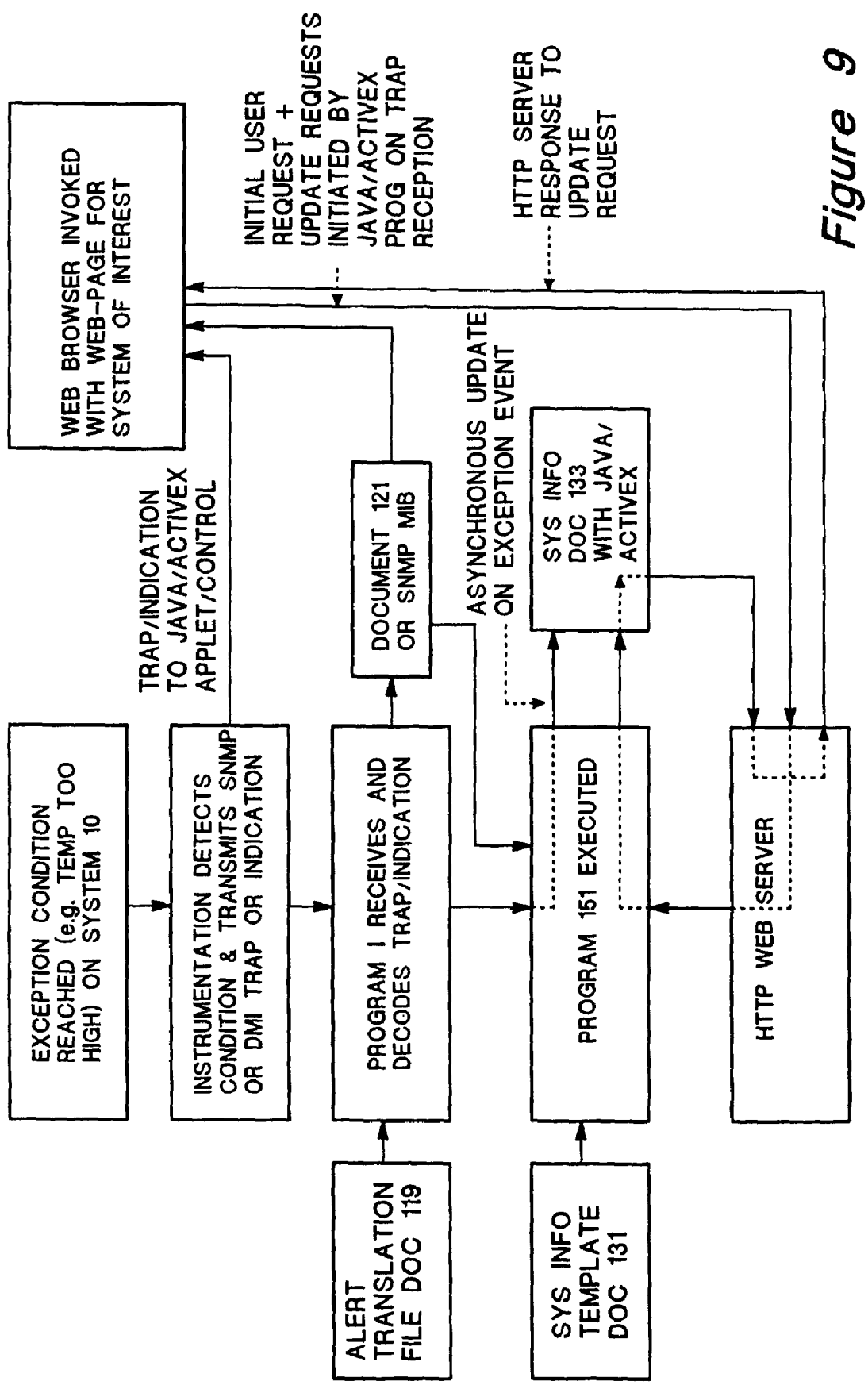

In a fourth implementation of this particular embodiment (see FIG. 9), document 102 is modified to include references to "active objects" such as a Java applet or an ActiveX program to create document 131. In this implementation, program 151 uses document 131 as input and produces document 133, which is similar to document 103 but includes the references to the active objects in document 131. A property of such active objects is that displaying them causes the browser to execute the "bytecode" corresponding to the active objects. The executing embedded programs (the active objects) in turn read the system status file document 121 at programmed intervals and change the displayed icons to correspond to the current system state in the same manner as described for the other implementations of this embodiment.

What is claimed is:

1. A method for verifying system configuration comprising:
generating configuration information for a managed system that indicates existing software and hardware residing on the managed system;
sending the configuration information from the managed system to a management system;
comparing, by the management system, the configuration information from the managed system with database information that indicates software and hardware supported by the management system in order to generate validity information that indicates any software or hardware on the managed system that is not supported by the management system; and
sending the validity information from the management system to the managed system.

2. A network comprising:
a managed system that includes hardware and software, the managed system generating configuration information that pertains to the software and the hardware;
a management system that receives the configuration information from the managed system and compares the configuration information from the managed system with database information that indicates software and hardware supported by the management system in order to generate validity information that indicates any software or hardware on the managed system that is not supported by the management system, the management system sending the validity information to the managed system.

* * * * *